United States Patent
Tseng et al.

(10) Patent No.: US 12,439,452 B2
(45) Date of Patent: Oct. 7, 2025

(54) METHOD FOR ZERO-WAIT DYNAMIC FREQUENCY SELECTION AND APPARATUS USING THE SAME

(71) Applicant: MEDIATEK INC., Hsinchu (TW)

(72) Inventors: Ting-Che Tseng, Hsinchu (TW); Kuo-Tai Chiu, Hsinchu (TW); Chi-Lun Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 393 days.

(21) Appl. No.: 18/069,298

(22) Filed: Dec. 21, 2022

(65) Prior Publication Data
US 2023/0217489 A1 Jul. 6, 2023

Related U.S. Application Data

(60) Provisional application No. 63/294,869, filed on Dec. 30, 2021.

(51) Int. Cl.
*H04W 74/0808* (2024.01)
*H04W 76/10* (2018.01)

(52) U.S. Cl.
CPC ....... *H04W 74/0808* (2013.01); *H04W 76/10* (2018.02)

(58) Field of Classification Search
CPC . H04W 74/0808; H04W 76/10; H04W 84/12; H04W 84/18; H04W 92/02; H04W 36/06; H04W 48/16; H04W 16/14; H04W 36/18; G01S 7/003
See application file for complete search history.

(56) References Cited

U.S. PATENT DOCUMENTS

| | | |
|---|---|---|
| 2010/0302966 A1 | 12/2010 | Matsuura |
| 2011/0096739 A1 | 4/2011 | Heidari et al. |
| 2013/0217340 A1 | 8/2013 | Nakatake |
| 2015/0063146 A1 | 3/2015 | Sadek et al. |
| 2015/0249990 A1 | 9/2015 | Kadiyala |
| 2017/0041949 A1 | 2/2017 | Ngo et al. |
| 2017/0181002 A1* | 6/2017 | Ngo ................ H04W 72/0453 |
| 2018/0027420 A1 | 1/2018 | Takahashi et al. |
| 2018/0213580 A1 | 7/2018 | Taskin et al. |
| 2018/0295520 A1 | 10/2018 | Garg et al. |

(Continued)

OTHER PUBLICATIONS

Chinese language office action dated Apr. 27, 2023, issued in application No. TW 111150861.

(Continued)

*Primary Examiner* — Ashley Shivers
(74) *Attorney, Agent, or Firm* — McClure, Qualey & Rodack, LLP (57) ABSTRACT

An apparatus is provided, which includes a first device, a second device, and a control circuit. The first device is configured to establish a wireless link with a wireless communication device in a first communication channel. The second device is configured to perform a first scan on a second communication channel to detect whether there are any radar signals on the second communication channel for a predetermined period of time. In response to the first scan satisfying a predetermined condition, the control circuit controls the first device to move the wireless link from the first communication channel to the second communication channel.

18 Claims, 7 Drawing Sheets

(56) References Cited

U.S. PATENT DOCUMENTS

2020/0267641 A1    8/2020  Strong et al.
2021/0409961 A1*  12/2021  Changlani ............. H04W 48/16

OTHER PUBLICATIONS

Extended European Search Report dated May 2, 2023, issued in application No. EP 22217321.3.
Chinese language office action dated Apr. 10, 2024, issued in application No. TW 111150861.

* cited by examiner

| Frequency (MHz) | 5180 | 5200 | 5220 | 5240 | 5260 | 5280 | 5300 | 5320 | | 5500 | 5520 | 5540 | 5560 | 5580 | 5600 | 5620 | 5640 | 5660 | 5680 | 5700 | | 5745 | 5765 | 5785 | 5805 | 5825 |
|---|---|---|---|---|---|---|---|---|---|---|---|---|---|---|---|---|---|---|---|---|---|---|---|---|---|---|
| Channel # | 36 | 40 | 44 | 48 | 52 | 56 | 60 | 64 | | 100 | 104 | 108 | 112 | 116 | 120 | 124 | 128 | 132 | 136 | 140 | | 149 | 153 | 157 | 161 | 165 |
| | U-NII-1 | | | | U-NII-2A | | | | | U-NII-2C | | | | | | | | | | | | U-NII-3 | | | | |

METHOD FOR ZERO-WAIT DYNAMIC FREQUENCY SELECTION AND APPARATUS USING THE SAME

CROSS REFERENCE TO RELATED APPLICATIONS

This application claims the benefits of U.S. Provisional Application No. 63/294,869, filed on Dec. 30, 2021, the entirety of which is incorporated by reference herein.

BACKGROUND OF THE INVENTION

Field of the Invention

The present invention relates to wireless communication, and, in particular, to a method for zero-waiting dynamic frequency selection (DFS) and an apparatus using the same.

Description of the Related Art

Wi-Fi networks are widely used in today's portable devices. IEEE 802.11 networks operate in 5 GHz and 2.4 GHz frequency bands. There are 23 orthogonal channels in the 5 GHz band and only 3 in the 2.4 GHz band. The 5 GHz band is less crowded and free of interference. However, some radar technologies (e.g., military radar, satellite communication, and weather radar) adapt the 5 GHz band, and Wi-Fi devices operating in 5 GHz band have to perform a channel allocation scheme, which is called "dynamic frequency selection" (DFS), to avoid conflicts with the aforementioned radar technologies. The actual mechanism, durations, radar pulse patterns, power levels, and frequency bands on which DFS is enforced may vary by country and jurisdiction.

IEEE 802.11 Wi-Fi stations, before transmitting in a target DFS channel, must validate that there is no radar activity on it by listening to radar activity on the target DFS channel for at least 60 seconds. However, the user of a DFS-enabled Wi-Fi station may feel that the long time it takes to conduct this DFS scan is inconvenient.

BRIEF SUMMARY OF THE INVENTION

An embodiment of the present invention provides an apparatus. The apparatus includes a first device, a second device, and a control circuit. The first device is configured to establish a wireless link with a wireless communication device in a first communication channel. The second device is configured to perform a first scan on a second communication channel to detect whether there are any radar signals on the second communication channel for a predetermined period of time. In response to the first scan satisfying a predetermined condition, the control circuit controls the first device to move the wireless link from the first communication channel to the second communication channel.

Another embodiment of the present invention provides a method, for use in an apparatus which includes a first device and a second device. The method includes the following steps: utilizing the first device to establish a wireless link with a wireless communication device in a first communication channel; utilizing the second device to perform a first scan on a second communication channel to detect whether there are any radar signals on the second communication channel for a predetermined period of time; in response to the first scan satisfying a predetermined condition, controlling the first device to move the wireless link from the first communication channel to the second communication channel.

Yet another embodiment of the present invention provides an apparatus. The apparatus includes: one or more antennas and a circuit. The circuit is configured to establish a wireless link with a wireless communication device in a first communication channel through the one or more antennas. The first communication channel has a first frequency band, and the wireless link has a second frequency band which is within the first frequency band. The circuit extends the wireless link using the first frequency band in response to there being no radar signals detected by a scan on a third frequency band other than the second frequency band within the first frequency band for a predetermined period of time.

BRIEF DESCRIPTION OF THE DRAWINGS

The present invention can be more fully understood by reading the subsequent detailed description and examples with references made to the accompanying drawings, wherein:

FIG. 1 illustrates portions of the 5 GHz Wi-Fi spectrum 100 including portions that require active monitoring for radar signals;

DETAILED DESCRIPTION OF THE INVENTION

The following description is made for the purpose of illustrating the general principles of the invention and should not be taken in a limiting sense. The scope of the invention is best determined by reference to the appended claims.

The following description is presented to enable one of ordinary skill in the art to make and use the invention, and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

FIG. 1 illustrates portions of the 5 GHz Wi-Fi spectrum 100 including portions that require active monitoring for radar signals. As shown in FIG. 1, the frequencies 1001 and channels 1002 make up portions of the 5 GHz Wi-Fi spectrum 100. The U-NII band is a regulatory domain for 5-GHz wireless devices defined by the Federal Communication Commission (FCC) in the United States, and it is part of the radio frequency spectrum used by IEEE 802.11ac/n devices and by many wireless ISPs, and it operates over four ranges, namely, the U-NII-1 band 101, U-NII-2 band 102, U-NII-3 band 103, and U-NII-4 band 104. For example, the U-NII-1 band 101 covers the 5.15-5.25 GHz range which includes channels 36 to 48. The U-NII-2A band 102 covers the 5.25-5.35 GHz range which includes channels 52 to 64. The U-NII-2A band 102 is subject to DFS radar detection and avoidance requirements. The U-NII-2C band 103 covers the 5.47-5.725 GHz range which includes channels 100 to 140. The U-NII-2C band 103 is also subject to DFS radar detection and avoidance requirements. The U-NII-3 band 104 covers the 5.725 to 5.850 GHz range which includes channels 149 to 165. Use of the U-NII-3 band 104 is restricted in some jurisdictions like the European Union and Japan. Accordingly, the 5 GHz Wi-Fi spectrum 100 shown in FIG. 1 may include DFS bands and non-DFS bands, which may vary from country to country depending on the local DFS regulations.

Figure 2:
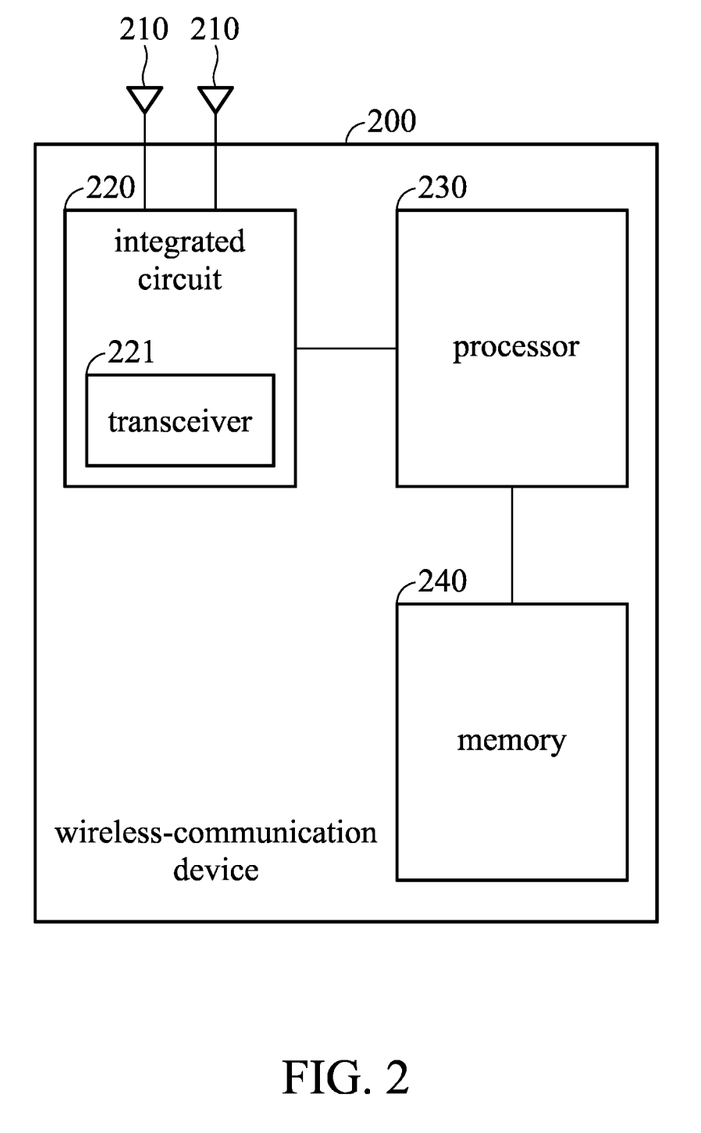
FIG. 2 is a diagram of a wireless communication device in accordance with an embodiment of the invention.

FIG. 2 is a diagram of a wireless communication device in accordance with an embodiment of the invention.

As shown in FIG. 2, the wireless communication device 200 may include one or more antennas 210, an integrated circuit 220, a processor 230, and a memory 240. The antennas 210 may transmit and receive radio frequency (RF) signals. The integrated circuit 220 is coupled to the antennas 210, and the integrated circuit 220 may include one or more transceivers 221 which may receive RF signal from the antennas 210, convert them to baseband signals, and send the baseband signals to the processor 230. The transceivers 221 may also convert the baseband signals from the processor 230, convert them to RF signal, and send out the RF signals to antennas 210. In some embodiments, the integrated circuit 220 may support functions of SU-MIMO (single-user multi-input multi-output) and MU-MIMO (multi-user multi-input multi-output), but the disclosure is not limited thereto.

The processor 230 may be a central processing unit (CPU), a general-purpose processor, a digital signal processor (DSP), or a microcontroller, but the disclosure is not limited thereto. In some embodiments, the integrated circuit 220 may be a Wi-Fi chip, and the integrated circuit 220 and the processor 230 may be implemented by a system-on-chip (SoC), but the disclosure is not limited thereto. The memory 240 may be a volatile memory or a non-volatile memory. For example, the volatile memory may be a static random access memory (SRAM) or a dynamic random access memory (DRAM), and the non-volatile memory may be a flash memory, a read-only memory (ROM), an erasable programmable read-only memory (EPROM), or an electrically erasable programmable read-only memory (EEPROM), but the disclosure is not limited thereto. In addition, the memory 240 may store instructions or firmware that can be executed by the processor 230 to control operations of the wireless communication device 200.

Figure 3A:
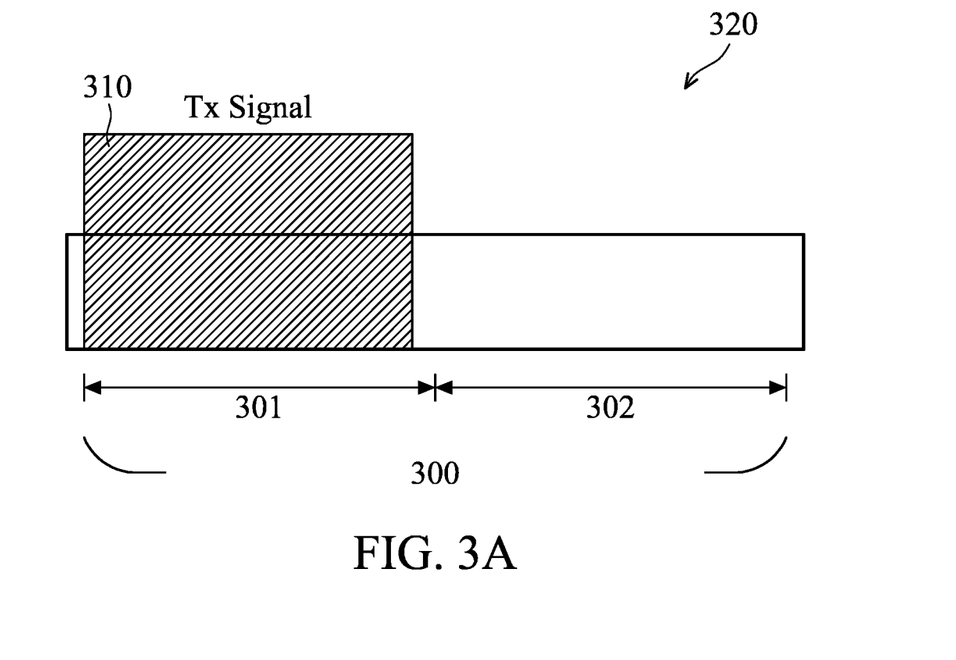
FIG. 3A shows the frequency band of an operating channel used by the wireless communication device before the CAC scan in accordance with an embodiment of the disclosure.
Figure 3B:
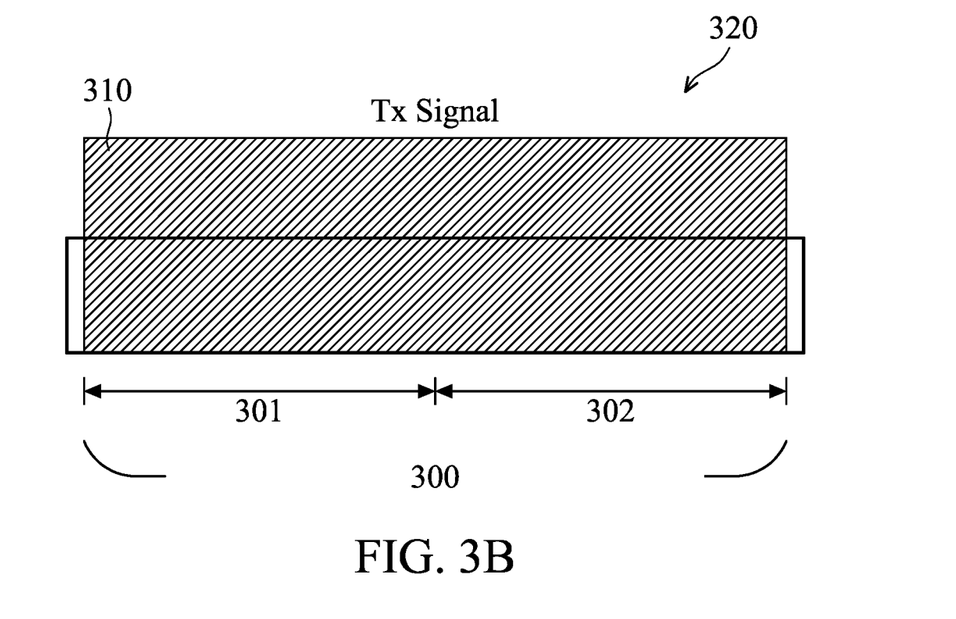
FIG. 3B shows the frequency band of the operating channel used by the wireless communication device after the CAC scan in accordance with the embodiment of FIG. 3A.

FIG. 3A shows the frequency band of an operating channel used by the wireless communication device before the CAC scan in accordance with an embodiment of the disclosure. FIG. 3B shows the frequency band of the operating channel used by the wireless communication device after the CAC scan in accordance with the embodiment of FIG. 3A.

Please refer to FIG. 2 and FIGS. 3A-3B. In an embodiment, the wireless communication device 200 may be a DFS master which is capable of actively scanning the DFS channels and performing a channel availability check (CAC) and periodic in-service monitoring (ISM) after the channel availability check. In addition, it is assumed that the wireless communication device 200 is capable of perform data transmission with another wireless communication device, such as an access point, a station, etc., over its supported frequency band 300 which has the maximum bandwidth supported by the wireless communication device 200. In the scenario shown in FIG. 3A, the wireless communication device 200 may transmit data to another wireless communication device via a wireless link 310 which is established over a non-DFS band 301 of an operating channel. The operating channel 320 includes a non-DFS band 301 and a DFS band 302, where the non-DFS band 301 has a first bandwidth, and the DFS band 302 has second bandwidth. It should be noted that, for ease of description, the non-DFS band 301 and the DFS band 302 shown in FIG. 3A are continuous in the 5 GHz spectrum. In some cases, the non-DFS band 301 and the DFS band 302 in FIG. 3A may be discontinuous in the 5 GHz spectrum. In some embodiments, the bandwidth of the operating channel 320 may be 20 MHz, 40 MHz, 80 MHz, etc., but the disclosure is not limited thereto.

Meanwhile, since the wireless communication device 200 does not have information about channels free of radar signals in the DFS band 302, the wireless communication device 200 may perform a CAC scan for a period of 60 seconds on the DFS band 302. Once the wireless communication device 200 detects that no any radar signals appear in the DFS band 302 after the 60-second CAC scan, the wireless communication device 200 may extend the bandwidth of the wireless link 310 for data transmission using both the non-DFS band 301 and the DFS band 302, that is, the overall bandwidth of the wireless link 310 for data transmission can be significantly increased.

Figure 4:
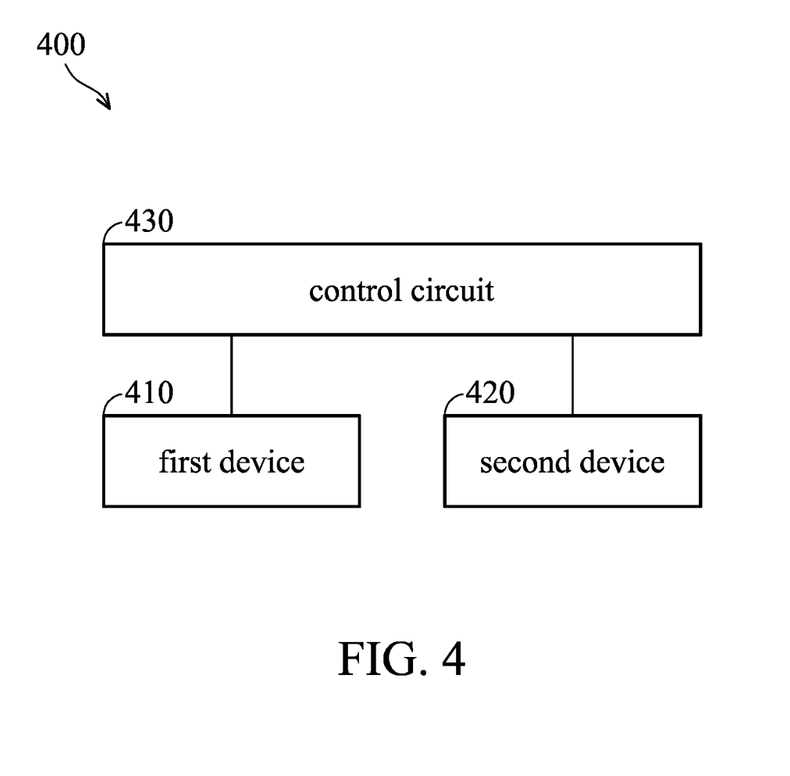
FIG. 4 is a diagram of a wireless communication device in accordance with another embodiment of the invention.

FIG. 4 is a diagram of a wireless communication device in accordance with another embodiment of the invention.

In another embodiment, the wireless communication device 400 may include a first device 410, a second device 420, and a control circuit 430. Each of the first device 410 and the second device 420 may be a standalone wireless communication device that is used to transmit and receive radio frequency (RF) signals, such as the wireless communication device 200 shown in FIG. 2. In addition, transmission and reception of RF signals performed by the first device 410 and the second device 420 are coordinated by the control circuit 430, which may be implemented by a central processing unit (CPU), a general-purpose processor, a digital signal processor (DSP), or a microcontroller, but the disclosure is not limited thereto.

In some embodiments, the first device 410 and the second device 420 may be DFS masters capable of performing CAC scans on the channels in the DFS band. In some implementations, the performance or hardware resources of the first device 410 may be higher than the second device 420. For example, the first device 410 may be the primary device for data transmission and reception, and thus the performance and hardware requirement of the first device 410 is higher. The second device 420 may be used to perform CAC scans while the first device 410 is transmitting data to or receiving data from other wireless communication device using a specific channel (e.g., channel A), and thus the second device 420 can be implemented using hardware with lower computation capability.

Figure 5A:
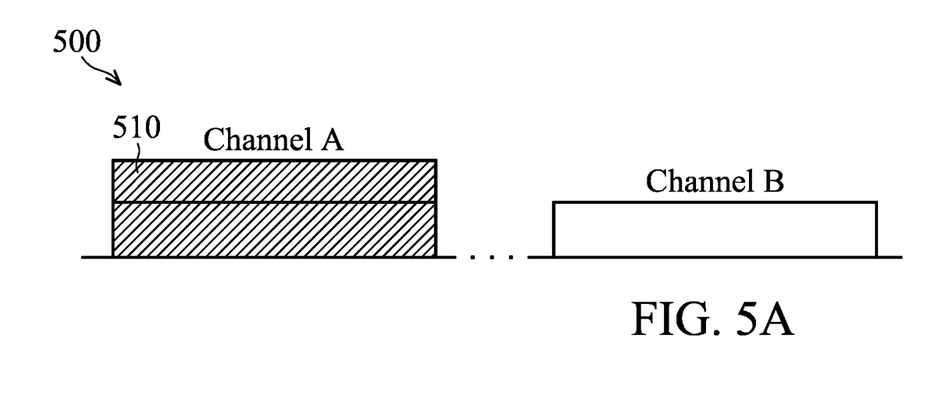
FIG. 5A shows the channel used by the wireless communication device before the CAC scan in accordance with the embodiment of FIG. 4.
Figure 5B:
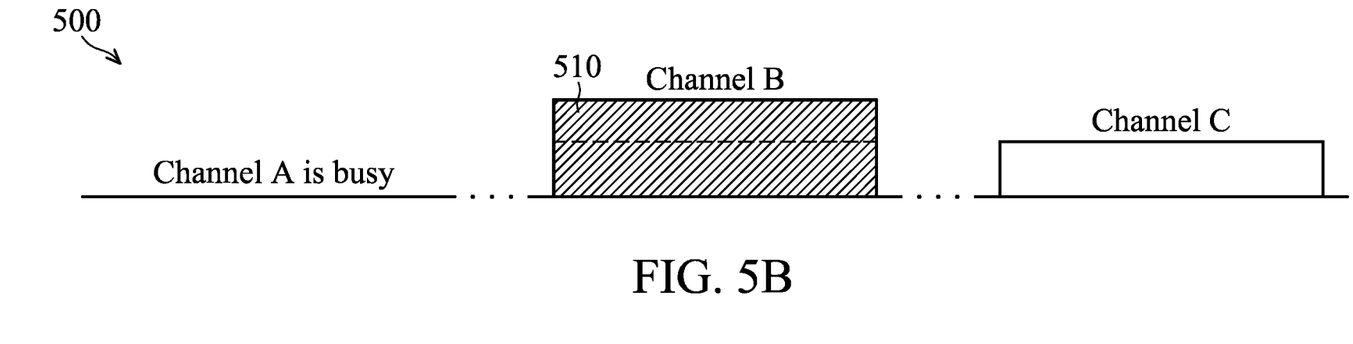
FIG. 5B shows the operating channel changed by the wireless communication device after the CAC scan in accordance with the embodiment of FIG. 5A.

FIG. 5A shows the channel used by the wireless communication device before the CAC scan in accordance with the embodiment of FIG. 4. FIG. 5B shows the operating channel changed by the wireless communication device after the CAC scan in accordance with the embodiment of FIG. 5A.

Please refer to FIG. 4 and FIGS. 5A-5B. In the scenario shown in FIG. 5A, there are a plurality of channels in the spectrum 500, and it is assumed that the first device 410 is operating in channel A, i.e., transmitting data to and receiving data to other wireless communication device via a wireless link 510 in channel A. Channel A may be in the non-DFS band or the DFS band. Meanwhile, the control circuit 430 may control the second device 420 to select a target DFS channel (e.g., channel B) from DFS channels other than channel A, and periodically detect whether there are any radar signals in the target DFS channel for 60 second (i.e., CAC scan), as shown in FIG. 5A.

If no radar signals are detected on the target DFS channel (e.g., channel B) after the 60-second scan, the second device 420 can inform the control circuit 430 that the target DFS channel (e.g., channel B) is available. If any radar signal is detected in the target DFS channel (e.g., channel B) during the 60-second (or longer) scan, the second device 420 may add the target DFS channel (e.g., channel B) to a blacklist for 30 minutes, that is, the target DFS channel will not be detected and used for 30 minutes according to the blacklist. Afterwards, the second device 420 may select another target DFS channel (e.g., channel C), and scan whether there are any radar signals on the selected target DFS channel for 60 seconds. The aforementioned operations can be repeated if any radar signal is detected in the selected target DFS channel.

It should be noted that when the first device 410 is operating in channel A, the first device 410 may also continuously monitor channel A for the presence of radar signals, which can be regarded as "In-service Monitoring". Specifically, given that the first device 410 is operating in channel A and the second device 420 detects that channel B (non-operating channel) is available via the 60-second CAC scan, the first device 410 can move the wireless link 510 for data transmission and reception from channel A to channel B when first device 410 detects there are radar signals appearing in channel A or when the first device 410 determines that channel A is busy.

For example, when a radar signal is detected in the operating channel or the first device 410 determines that the operating channel is busy, the first device 410 will cease transmissions on the current operating channel within a predetermined period of time. At the end of this period, the first device 410 will have ceased transmissions and moved to a new channel. Given that the wireless communication device 400 is an access point and is connected to one or more client devices, before moving channels, the first device 410 of the wireless communication device 400 may send a "channel switch announcement" frame defined in the IEEE 802.11 specification to the connected client devices to advise them which channel the wireless communication device 400 will be moving to. In some implementations, when a radar signal is detected in the current operating channel of the first device 410, the second device 420 may select one of the available non-DFS channels as the target channel to be moved to, or select a fixed channel as the target channel, but the disclosure is not limited thereto.

After the first device 410 has successfully moved the operating channel from channel A to channel B, the second device 420 may selected a new target DFS channel (e.g., channel C), and periodically detect whether there are any radar signals in the new target DFS channel for 60 second (i.e., CAC scan).

Thus, in view of the wireless communication device 400, the wireless link 510 used by the wireless communication device 400 can be changed from channel A to channel B quickly and seamlessly because the second device 420 can detect the available target DFS channel (i.e., no radar signals being detected) in advance. Thus, the user of the wireless communication device 400 will not perceive the latency for changing the operating channel, thereby achieving "zero-wait DFS" and improving the user experience.

Figure 6A:
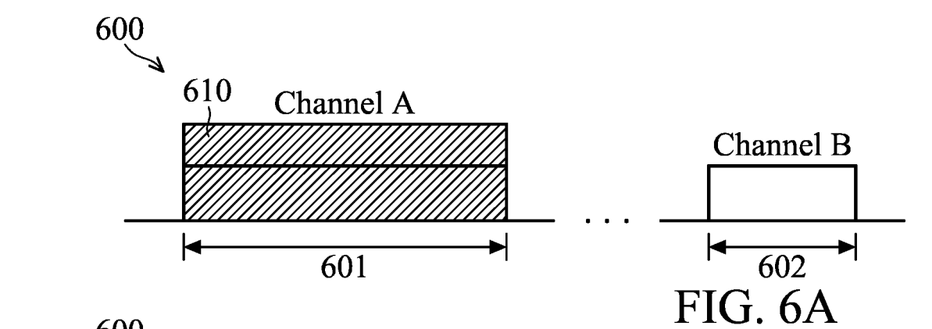
FIG. 6A shows the channel used by the wireless communication device before the CAC scan in accordance with the embodiment of FIG. 4.
Figure 6B:
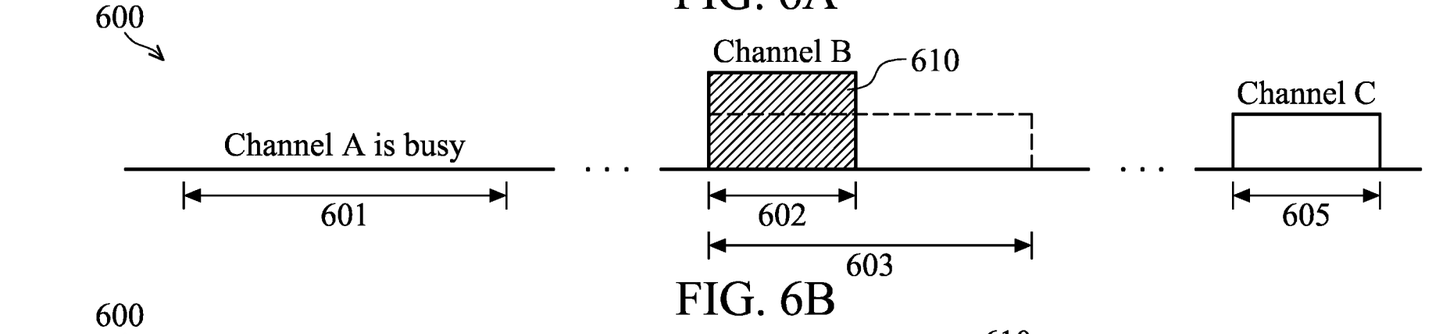
FIG. 6B shows the operating channel changed by the wireless communication device after the first CAC scan in accordance with the embodiment of FIG. 6A.
Figure 6C:
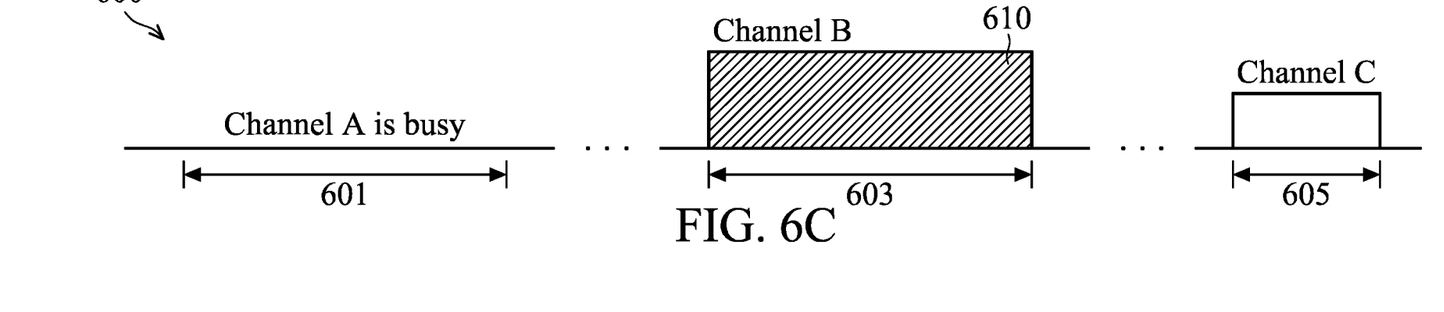
FIG. 6C shows the bandwidth of the wireless link changed by the wireless communication device after the second CAC scan in accordance with the embodiment of FIG. 6B.

FIG. 6A shows the channel used by the wireless communication device before the CAC scan in accordance with the embodiment of FIG. 4. FIG. 6B shows the operating channel changed by the wireless communication device after the first CAC scan in accordance with the embodiment of FIG. 6A. FIG. 6C shows the bandwidth of the wireless link changed by the wireless communication device after the second CAC scan in accordance with the embodiment of FIG. 6B.

Please refer to FIG. 4 and FIGS. 6A-6C. In the scenario shown in FIG. 6A, there are a plurality of channels in the spectrum 600 (e.g., channels A to C, etc.), and it is assumed that the first device 410 is operating in channel A, i.e., transmitting data to and receiving data to other wireless communication device via a wireless link 610 in channel A. Channel A may be in the non-DFS band or the DFS band. Meanwhile, the control circuit 430 may control the second device 420 to select a target DFS channel (e.g., channel B) from DFS channels other than channel A, and periodically detect whether there are any radar signals in a selected portion (i.e., band 602) of the target DFS channel for 60 second (i.e., CAC scan), as shown in FIG. 6A. In addition, the first device 410 can operate in a given channel with a larger bandwidth (i.e., band 601 of channel A) while the second device 420 detects whether any radar signals are present in a selected portion of a target DFS channel (i.e., band 602 of channel B). For example, for ease of description, the first device 410 can operate in channel A with a full bandwidth of 40 MHz while the second device 420 can detect whether any radar signals are present in the selected portion of the target DFS channel, where the selected portion may have a limited bandwidth of 20 MHz due to limited hardware equipped in the second device 420. However, the present disclosure is not limited to the aforementioned bandwidths on the operating channel and the selected portion. It should be noted that the selected portion of channel B may be located anywhere within the full frequency band (i.e., band 603) of channel B.

If no radar signals are detected on the selected portion (i.e., band 602) of the target DFS channel (e.g., channel B) after the 60-second scan, the second device 420 can inform the control circuit 430 that the selected portion (i.e., band 602) of the target DFS channel (e.g., channel B) is available. If any radar signal is detected in the selected portion (i.e., band 602) of the target DFS channel (e.g., channel B) during the 60-second (or longer) scan, the second device 420 may add the whole target DFS channel (e.g., channel B) to a blacklist for 30 minutes, that is, the target DFS channel will not be detected and used for 30 minutes according to the blacklist. Afterwards, the second device 420 may select a portion (i.e. band 605) of a new target DFS channel (e.g., channel C), and scan whether there are any radar signals on the selected portion (i.e. band 605) of the new target DFS channel for 60 seconds. The aforementioned operations can be repeated if any radar signal is detected in the selected portion of the target DFS channel. It should be noted that the center frequency of the new target DFS channel can be higher or lower than that of the operating channel of the first device 410.

It should be noted that when the first device 410 is operating in channel A, the first device 410 may also continuously monitor channel A for the presence of radar signals, which can be regarded as "In-service Monitoring". Specifically, given that the first device 410 is operating in channel A and the second device 420 detects that the selected portion of the target DFS channel (e.g., channel B) is available via the 60-second CAC scan, the first device 410 can move the wireless link 610 for data transmission and reception from channel A to channel B when first device 410 detects there are radar signals appearing in channel A or when the first device 410 determines that channel A is busy.

For example, when a radar signal is detected in the operating channel or the first device 410 determines that the operating channel is busy, the first device 410 will cease transmissions on the operating channel within a predetermined period of time. At the end of this period, the first device 410 will have ceased transmissions and moved to a new channel. Given that the wireless communication device 400 is an access point and is connected to one or more client devices, before moving channels, the first device 410 of the wireless communication device 400 may send a "channel switch announcement" frame defined in the IEEE 802.11 specification to the connected client devices to advise them which channel the wireless communication device 400 will be moving to. In some implementations, when a radar signal is detected in the current operating channel of the first device 410, the second device 420 may select one of the available non-DFS channels as the target channel to be moved to, or select a fixed channel as the target channel, but the disclosure is not limited thereto. It should be noted that the second device 420 is still capable of detecting a selected portion in the new target channel (i.e., can be either a DFS channel or a non-DFS channel).

After the first device 410 has successfully moved the operating channel from channel A to channel B, the first device 410 operates on channel B with a limited bandwidth as previously detected by the second device 420. Then, the first device 410 will perform in-service monitoring on the full frequency band (i.e., band 603) of the operating channel (i.e., channel B) for a predetermined period of time (i.e., in-service CAC period such as 60 seconds) so as to determine whether there are any radar signals in the full frequency band (i.e., band 603) of the operating channel (i.e., channel B). Meanwhile, the control circuit 430 may control the second device 420 to select a portion (e.g., band 605) of a new target DFS channel (e.g., channel C), and periodically detect whether there are radar signals in the selected portion of the new target DFS channel.

Thus, in view of the wireless communication device 400, the wireless link 610 used by the wireless communication device 400 can be changed from channel A to channel B quickly and seamlessly because the second device 420 can detect the available target DFS channel in advance. In addition, the second device 420 with fewer hardware resources can be used to detect the available DFS channel within a limited frequency band, so as to reduce the cost of the wireless communication device 400. The first device 410 can perform in-service monitoring after changing to a new DFS channel which is previously detected available by the second device 420. When the first device 410 detects that the full frequency band of the new DFS channel are available (i.e., no radar signals being detected for at least 60 seconds), the first device 410 can extend the wireless link 610 from a limited bandwidth to full bandwidth of the new DFS channel (i.e., from a limited frequency band to the full frequency band of the new DFS channel).

Accordingly, the user of the wireless communication device 400 will not perceive the latency for changing the operating channel, thereby achieving "zero-wait DFS", improving the user experience, and lowering costs of the wireless communication device. In addition, the wireless communication device 400 can further extend the bandwidth of the wireless link in the new operating channel when no radar signals are detected within the full frequency band of the new operating channel by in-service monitoring for a predetermined period of time, thereby improving the performance of the wireless communication device.

Figure 7:
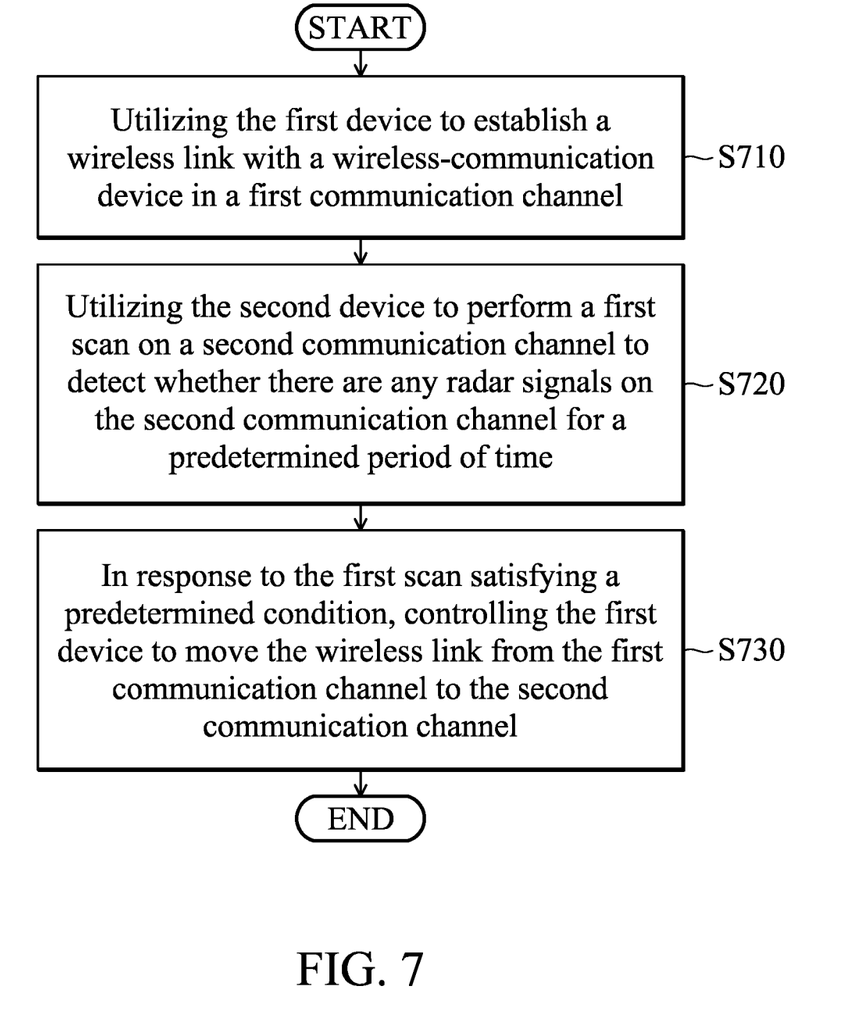
FIG. 7 is a flow chart of a method for zero-wait dynamic frequency selection in accordance with an embodiment of the disclosure.

FIG. 7 is a flow chart of a method for zero-wait dynamic frequency selection in accordance with an embodiment of the disclosure. Please refer to FIG. 4 to FIG. 7.

Step 710: utilizing the first device 410 to establish a wireless link with a wireless communication device in a first communication channel. For example, the wireless link can use the full frequency band (i.e., full bandwidth) of the first communication channel (e.g., channel A), as shown in FIG. 5A and FIG. 6A.

Step 720: utilizing the second device to perform a first scan on a second communication channel to detect whether there are any radar signals on the second communication channel for a predetermined period of time. For example, the first scan may refer to a CAC scan on the second communication channel (e.g., channel B in FIG. 5A) for the predetermined period of time (e.g., at least 60 seconds) to detect whether there are radar signals on the second communication channel. Alternatively, the first scan may refer to a CAC scan on the selected portion (e.g., band 602) of the second communication channel, as shown in FIGS. 6A and 6B.

Step 730: in response to the first scan satisfying a predetermined condition, controlling the first device to move the wireless link from the first communication channel to the second communication channel. For example, in the embodiments of FIG. 5A-5B, the predetermined condition may indicate that the first device determines that the first communication channel is busy and there are no radar signals being detected by the first scan on the second communication channel for the predetermined period of time. In addition, the first device may perform a second scan on the first communication channel to detect whether there are any radar signals on the first communication channel for the predetermined period of time. In an alternative embodiment, the predetermined condition may indicate that there are radar signals detected by the second scan on the first communication channel, and that no radar signals are detected by the first scan on the second communication channel for the predetermined period of time. Therefore, in either one of these two predetermined conditions is satisfied, the first device 410 will move the wireless link from the first communication channel to the second communication channel.

Moreover, the predetermined conditions in the embodiments of FIGS. 6A-6C are similar to those in the embodiments of FIGS. 5A-5B. In response to the wireless link being moved to the selected portion of the second communication channel, the first device 410 may perform a third scan on the remaining portion of the second communication channel for the predetermined period of time because the second device 420 previously performs the second scan on the selected portion of the second communication channel. Thus, in response to there being no radar signals detected by the third scan on the remaining portion of the second communication channel for the predetermined period of time, the control circuit 430 may control the first device 410 to extend the wireless link to the whole second communication channel.

In view of the above, a method for zero-waiting dynamic frequency selection (DFS) and an apparatus using the same are provided, which are capable of detecting whether a target DFS channel is available (e.g., by a CAC scan for at least 60 seconds) in advance using the second device (e.g., may be a device with fewer hardware resources or lower computation capability than the first device) before the first device determines to move the wireless link from the operating channel to the target DFS channel based on the scan results on the first communication channel and the second communication channels. Thus, the wireless link used by the first device can be changed from channel A to channel B quickly and seamlessly, thereby achieving "zero-wait DFS" and improving the user experience.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any device that can contain, store, communicate, propagate, or transport the program for use by or in connection with the instruction execution system, device, or device.

The medium may be an electronic, magnetic, optical, electromagnetic, infrared, semiconductor system (or device or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus, comprising:
   a first device, configured to establish a wireless link with a wireless communication device in a first communication channel;
   a second device, configured to perform a first scan on a selected portion of a second communication channel to detect whether there are any radar signals on the selected portion of the second communication channel for a predetermined period of time; and
   a control circuit, coupled to the first device and the second device;
   wherein in response to the first scan satisfying a predetermined condition, the control circuit controls the first device to move the wireless link from the first communication channel to the selected portion of the second communication channel.

2. The apparatus as claimed in claim 1, wherein the predetermined condition indicates that the first device determines that the first communication channel is busy and there are no radar signals being detected by the first scan on the second communication channel for the predetermined period of time.

3. The apparatus as claimed in claim 1, wherein the first device performs a second scan on the first communication channel to detect whether there are any radar signals on the first communication channel for the predetermined period of time.

4. The apparatus as claimed in claim 3, wherein the predetermined condition indicates that there are radar signals detected by the second scan on the first communication channel, and that no radar signals are detected by the first scan on the second communication channel for the predetermined period of time.

5. The apparatus as claimed in claim 1, wherein in response to the second device detecting that there are radar signals on the second communication channel, the second device adds the second communication channel to a blacklist, and the second communication channel is not detected and used by the first device and the second device according to the blacklist for a predetermined duration.

6. The apparatus as claimed in claim 1, wherein before moving from the first communication channel to the second communication channel, the first device sends a channel-switch announcement frame to inform the wireless communication device to move the wireless link to the second communication channel.

7. The apparatus as claimed in claim 1, wherein in response to the wireless link being moved to the selected portion of the second communication channel, the first device performs a third scan on the remaining portion of the second communication channel to detect whether there are any radar signals on the remaining portion of the second communication channel for the predetermined period of time, and the second device performs a third scan on a second selected portion of a third communication channel to detect whether there are any radar signals on the second selected portion of the third communication channel for the predetermined period of time.

8. The apparatus as claimed in claim 7, wherein in response to there being no radar signals detected by the third scan on the remaining portion of the second communication channel for the predetermined period of time, the first device extends the wireless link to the whole second communication channel.

9. A method, for use in an apparatus which comprises a first device and a second device, the method comprising:

utilizing the first device to establish a wireless link with a wireless communication device in a first communication channel;

utilizing the second device to perform a first scan on a selected portion of a second communication channel to detect whether there are any radar signals on the selected portion of the second communication channel for a predetermined period of time;

in response to the first scan satisfying a predetermined condition, controlling the first device to move the wireless link from the first communication channel to the selected portion of the second communication channel.

10. The method as claimed in claim 9, wherein the predetermined condition indicates that the first device determines that the first communication channel is busy and there are no radar signals being detected by the first scan on the second communication channel for the predetermined period of time.

11. The method as claimed in claim 9, further comprising:
utilizing the first device to perform a second scan on the first communication channel to detect whether there are any radar signals on the first communication channel for the predetermined period of time.

12. The method as claimed in claim 11, wherein the predetermined condition indicates that there are radar signals detected by the second scan on the first communication channel, and that no radar signals are detected by the first scan on the second communication channel for the predetermined period of time.

13. The method as claimed in claim 9, further comprising:
in response to the second device detecting that there are radar signals on the second communication channel, controlling the second device to add the second communication channel to a blacklist,
wherein the second communication channel is not detected and used by the first device and the second device according to the blacklist for a predetermined duration.

14. The method as claimed in claim 9, further comprising:
before moving from the first communication channel to the second communication channel, controlling the first device to send a channel-switch announcement frame to inform the wireless communication device to move the wireless link to the second communication channel.

15. The method as claimed in claim 9, further comprising:
in response to the wireless link being moved to the selected portion of the second communication channel, controlling the first device to perform a third scan on the remaining portion of the second communication channel to detect whether there are any radar signals on the remaining portion of the second communication channel for the predetermined period of time, and controlling the second device to perform a fourth scan on a second selected portion of a third communication channel to detect whether there are any radar signals on the second selected portion of the third communication channel for the predetermined period of time.

16. The method as claimed in claim 15, further comprising:
in response to there being no radar signals detected by the third scan on the remaining portion of the second communication channel for the predetermined period of time, controlling the first device to extend the wireless link to the whole second communication channel.

17. An apparatus, comprising:
one or more antennas; and
a circuit, configured to establish a wireless link with a wireless communication device in a first communication channel through the one or more antennas, wherein the first communication channel has a first frequency band, and the wireless link has a second frequency band which is within the first frequency band,
wherein the circuit extends the wireless link using the first frequency band in response to there being no radar signals detected by a scan on a third frequency band other than the second frequency band within the first frequency band for a predetermined period of time.

18. The apparatus as claimed in claim 17, wherein the second frequency band is a non-DFS (dynamic frequency selection) band, and the third frequency band is a DFS band, and the scan is an in-service monitoring scan.

* * * * *